United States Patent Office 3,036,986
Patented May 29, 1962

3,036,986
ACCELERATOR FOR THE PHENOLIC RESIN-CURE OF BUTYL RUBBER, BUTYL RUBBER FORMULATION CONTAINING SAME, AND PROCESS FOR CURING BUTYL RUBBER THEREWITH
Francis M. O'Connor, Kenmore, and Tudor L. Thomas, Snyder, N.Y., assignors to Union Carbide Corporation, a corporation of New York
No Drawing. Filed Apr. 14, 1959, Ser. No. 806,213
18 Claims. (Cl. 260—43)

This invention relates to curing accelerators for butyl rubber formulations. It relates, more particularly, to an improved process for curing butyl rubber formulations utilizing a strong acid accelerator.

Butyl rubber is, generally speaking, a synthetic rubber obtainable by processes well known to the art. One such process includes the copolymerization of isobutylene, about 98%, with about 2% isoprene or butadiene. The polymerization process is conducted at $-50°$ C. to $-100°$ C. in a liquid hydrocarbon with an $AlCl_3$ or similar type catalyst. Butyl rubber, when properly compounded and cured, resists chemical attack and aging even at high temperatures; it is relatively impermeable to gases and has good vibration insulation characteristics.

Butyl rubber, as is well known and disclosed in U.S. Patent 2,726,224 issued December 6, 1955 to Peterson et al., is the type of synthetic rubber made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3 and 1,4-dimethyl butadiene-1,3. The butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term butyl rubber.

While the processing of butyl rubber is in many respects similar to the processing of other types of rubber one of the more different aspects of the former includes the curing stage. For instance, many of the accelerators which are effectively used in other synthetic rubbers, are found to be entirely inadequate performers in the butyl type.

One satisfactory curing system for butyl rubber which has found wide acceptance is generally referred to as the resin cure. In this system, a para-substituted dimethylol phenolic resin is used as the cross-linking agent in place of sulphur or a dioxime. While the heat-reactive dimethylol phenol is in itself sufficient to cure butyl rubber formulations under normal production conditions of heat and pressure, it is relatively slow for most applications. To be commercially practical, therefore, the curing rate must be increased by the use of accelerators or catalysts in conjunction with the phenolic resin.

The primary function of an accelerator in any rubber formulation is to increase the rate of curing. Such an agent may also effect the physical properties of the rubber so that preferably any accelerator additive should tend toward the improvement of such properties.

For instance, materials such as heavy metal halides, chlorinated paraffin wax, polychloroprene, chlorosulfonated polyethylene and organic sulfonic acids have been used as accelerators. These materials, though, possess the disadvantages of being either so active that they are difficult to process, they stain and cause sticking of the rubber to mixing equipment or corrode molds. Conversely, they may be so inactive that they must of necessity be used at very high temperatures or for very long curing cycles at conventional temperatures.

It is therefore an object of the invention to provide a method for utilizing powerful accelerators to obtain rapid rates of cure in butyl rubber formulations without the concomitant disadvantages normally encountered when the prior art accelerators are employed.

It is also an object to provide a method for introducing quantities of certain acids into a butyl rubber formulation in an inert carrier medium.

In brief, the invention contemplates a method for accelerating the curing reaction of a butyl rubber formulation containing a phenol dialcohol resin as curing agent, which includes the addition to said formulation of a sufficient amount of an active accelerator agent such as a strong acid, to hasten the cure. Said agent is introduced into the formulation while contained within the pores of an activated, crystalline, zeolitic molecular sieve adsorbent. Because of the unique properties of such sieve adsorbents, as will hereinafter be described, the agent is effectively isolated and thus cannot react prematurely with the other ingredients of the formulation during the various stages of processing such as mixing, extruding, etc. Subsequently, during the vulcanization process, the contained agent is released either by thermal means or by displacement with a more strongly held substance to accelerate the cross-linking or curing reaction.

Among the accelerators adaptable to the invention are strong acids such as HCl, HBr, HI and other halogen-substituted organic acids. Other compounds found to be usable include unsaturated organic halides as 1,4-dichlorobutene, 2-chloropropene, 2-bromopropene and 2-iodopropene; also, acyl halides as benzoyl chloride; and alkyl benzene as alpha,alpha,alpha trichlorotoluene.

The zeolites herein referred to are those natural and synthetic crystalline alumino-silicate materials having a three-dimensional pore size structure. These zeolites are clearly distinguishable by their chemical composition and crystalline structure as determined by X-ray diffraction patterns.

The structure and properties of synthetic crystalline zeolitic molecular sieves are described in several publications, for example, Breck et al., Jour. Am. Chem. Soc., 78, 2338 (1956), Breck et al., Jour. Am. Chem. Soc., 78, 5963 (1956), and Reed et al., Jour. Am. Chem. Soc., 78, 5972 (1956), and in U.S. Patents Nos. 2,882,243 (zeolite A) and 2,886,244 (zeolite X) issued April 14, 1959 to R. M. Milton; Serial No. 711,565 (zeolite L) filed January 28, 1958 by D. W. Breck et al, now abandoned; Serial No. 728,057 (zeolite Y) filed April 14, 1958 by D. W. Breck, now abandoned; Serial No. 680,383 (zeolite D) filed August 26, 1957 by D. W. Breck et al.; and U.S. Patent No. 2,950,952 (zeolite T) issued August 30, 1960 to D. W. Breck et al.

Examples of naturally occurring crystalline zeolitic molecular sieves which are useful in the present invention are faujasite, erionite, calcium chabazite, and mordenite which has been hydrogen-exchanged.

The zeolite materials, both natural and synthetic above mentioned have unique adsorptive properties both as to selectivity and capacity. Their particular crystalline structure offer large surface areas for adsorption, their controlled pore sizes also allow an adsorptive selectivity based on the size of molecule of the material to be adsorbed.

In the practice of the present invention, it is necessary that the pore size of the natural or synthetic crystalline zeolite used to be sufficiently large to accept the acid molecules. For example, if HCl is the accelerator acid to be adsorbed, the pore dimension for adsorption must be such that it can accept substances having a particular critical dimension. When strong acids, other than HCl, having larger molecules are employed in the process, it is necessary to use a molecular sieve with a commensurably larger pore size. With reference to molecular sieves, the critical dimension is defined as the diameter of the smallest cylinder which will accommodate a model of the molecule constructed using the best available van der Waals' radii, bond angles and bond length.

Molecular sieves, when suitably activated, are remarkably stable in the presence of anhydrous strong acids generally used as accelerators. For example, comparison of X-ray diffraction patterns of an activated Type 13X molecular sieve taken before and after loading with anhydrous hydrogen chloride, showed that there was essentially no deterioraton of the crystal structure by the acid. The adsorption of anhydrous HCl on natural and synthetic crystalline molecular sieves of suitable pore size is almost completely reversible. When adsorbed on synthetic molecular sieves or on the naturally occurring species free from appreciable amounts of contaminants, the resulting accelerating agents are usually substantially free from acidic odor when handled and stored under proper conditions.

Although it is known that other adsorbent materials not of the crystalline zeolitic molecular sieve class such as activated alumina and amorphous zeolites may adsorb HCl, it has been found that when combined with HCl, the combination gives off a very strong offensive odor of HCl. The fumes which may be evolved either during storage of the HCl-adsorbent combination or during processing, storage and curing of a formulation containing such as combination, seriously detract from the use of non-crystalline adsorbents.

The term "activated," as used herein, refers to a condition where the molecular sieve is treated so that it preferably contains less than about one percent by weight of water. This activation step may be conveniently conducted by heating, preferably at about 350° C. under reduced pressure until substantially all of the water is removed.

In the examples and illustrations of the invention, reference to the "scorch" characteristic of a material defines a term of the rubber or plastic art indicating that point in the processing of said materials at which there is premature curing of the system. The Mooney scorch test is a test for determining the conditions of time and temperature for causing a compounded mixture to scorch or prematurely cure.

The data of Table I below illustrate the adsorption of anhydrous hydrogen chloride on a sample of activated sodium zeolite X at −78° C.

TABLE I

*Adsorption at −78° C. of Anhydrous HCl on Sodium Zeolite X*

| Adsorption Pressure, mm. Hg | Wt. Percent Adsorbed [1] |
|---|---|
| 10 | 20.8 |
| 28 | 28.2 |
| 123 | 36.4 |
| 294 | 37.6 |
| 733 | 38.6 |

[1] Wt. percent adsorbed = grams of HCl per hundred grams of activated molecular sieve.

An advantageous effect of accelerating the curing process of butyl rubber with an anhydrous hydrogen chloride-loaded molecular sieve, resides in the "safe" (that is, the absence of scorch or premature curing) processing obtained thereby. Processing of a formulation containing such an accelerating agent was found to give a curing rate equivalent to that obtained with heavy metal halides, which are reported to be the most active accelerators.

The highly corrosive nature of hydrogen chloride is well known. Although HCl-loaded molecular sieve has been found to be non-corrosive under most conditions, it is recommended that about 1.0 phr. zinc oxide be used in conjunction with this product in order to ensure that no corrosion is obtained during processing or vulcanization. In this way any hydrogen chloride which does not react directly as a catalyst, should react with the zinc oxide to form zinc chloride in situ. Laboratory tests of the formulations containing HCl-loaded molecular sieves and zinc oxide have caused no corrosion even on prolonged contact with metal specimens.

One embodiment of the invention may be illustrated when considered in conjunction with the manufacture of a butyl rubber, tire curing bag. These bags are generally used to assist in the forming and vulcanizing of rubber tires. Actually, the tire bag is disposed within the tire casing and, on being inflated, forces the casing outward against the mold walls. The bag, of course, must be used repeatedly and continuously so that resistance to deterioration of physical properties on exposure to high temperatures and severe mechanical abuse for extended periods of time is desirable.

Resin-cured butyl rubber, particularly when polychloroprene, chlorosulfonated polyethylene, and brominated butyl elastomers are used as accelerators in the tire bag formulation, has superior heat-aging properties and improved resistance to over-vulcanization caused by migratory sulfur from the tire stock. In a tire-curing bag formulation, a safe-processing, fast-curing stock is desired which will maintain a minimum tensile strength of about 1000 lb. per sq. in. and a minimum elongation of about 200% after being aged in air at 300° F. for six days.

Referring to Table II, there is shown a typical tire-curing bag formulation containing the following ingredients:

|  | Phr.[1] |
|---|---|
| Butyl (containing about 2 mol-percent isoprene) | 100 |
| High abrasion furnace carbon black (HAF) | 60 |
| Process oil ("Vistanex") | 10 |
| Stearic acid | 1 |
| Dimethylol phenolic resin ("Amberol ST-137") | 12 |

[1] Parts per hundred parts of rubber.

to which was added various accelerators such as Neoprene W, stannous chloride and trifluoroacetic acid.

From the tabulated results of Table II, it may be seen that neoprene W, test (1) gives a very long Mooney scorch time at 250° F., cures relatively slowly at 320°

F. and just meets the heat-aging requirements at 300° F.

Stannous chloride (2) gives a very rapid cure rate, but also results in a very short Mooney scorch time and fails to meet the elongation requirements upon being aged at 300° F. Furthermore, this formulation was very difficult to blend on a two-roll mill because of excessive sticking of the compound to the rolls.

The use of trifluoroacetic acid-loaded molecular sieve (3) gave a very satisfactory Mooney scorch time at 250° F. and a fast cure rate at 320° F. However, this formulation did not meet the heat-aging requirements arbitrarily set up for tire curing bag formulations. When this accelerator was used in conjunction with neoprene W, however, as noted in test (4), the cure rate and Mooney scorch time were equivalent to the formulation without neoprene W and the aging characteristics were considerably improved.

The use of an HCl-loaded molecular sieve in conjunction with zinc oxide (5) also gave a very good processing safety at 250° C. and a rapid cure rate at 320° F. However, this formulation also did not meet the heat-aging requirements specified for tire curing bags.

Addition of neoprene W to the formulation of (5) resulted in a much improved Mooney scorch at 250° F. and an equivalent rate of cure at 320° F. and gave considerably improved heat-aging properties. Other polychloroprenes such as other members of the W class and the G types, as well as the halogenated elastomers such as chlorosulfonated polyethylene and brominated butyl; and non-halogenated elastomers such as styrene-butadiene rubber and natural rubber may be used in the practice of this invention in place of neoprene W.

It should be emphasized that there are many commercial applications for butyl rubber products where the heat-aging requirements are not so stringent as those met in test (6). Therefore, the process of the invention need not necessarily use the elastomer-type material along with the acid-loaded molecular sieves. It is readily understandable that a rubber processor would add the elastomer-type materials to the formulation only where the ultimate service conditions for the butyl product called for good heat-aging characteristics.

As previously mentioned, it is known that strong acids can be added directly as catalyst in resin-cured butyl rubber systems. Such a direct and concentrated addition of acids, though, usually creates the problems of corrosion, toxicity, storage, handling and lack of control during processing of the formulation. Test (7) of Table II illustrates the effect of adding an acid (chloroacetic) directly to the formulation, compared with that of compounding the acid-loaded molecular sieve (8) into another sample of the same formulation. As may be seen, the acid-loaded sodium zeolite X molecular sieve increased the scorch time from 108 to 144 minutes and similarly the cure rate showed a marked improvement, i.e., from a value of 873 to 1175.

Chemical-loaded molecular sieves can generally be added to rubber formulations at various concentrations without affecting the processing safety. With very volatile chemicals, such as HCl, however, greater effects are expected than are obtained with relatively non-volatile compounds. Table III indicates that the processing safety and rate of cure are affected by the concentration of HCl-loaded molecular sieve. The Mooney scorch time decreases and the rate of cure increases as the concentration of loaded sieve is increased. The heat-aging properties appear to be independent of the concentration of HCl-loaded molecular sieve. An improvement in compression set was obtained at higher accelerator concentrations. The most severe drop in scorch time occurred when the concentration of HCl-loaded molecular sieve was increased from 3.0 phr. to 4.0 phr. Therefore, it appears that the best combination of curing and processing characteristics are obtained when about 3.0 phr. of HCl-loaded molecular sieve are used.

The efficiency with which molecular sieves can isolate an adsorbed chemical from a formulation in which a chemical-loaded molecular sieve is dispersed is generally a function of the weight percent loading of active chemical. The loading which provides the best handling characteristics and optimum performance in any given application must therefore be determined.

It has been found, for instance, that loadings of up to 15 weight percent HCl on a molecular sieve gave products with virtually no acidic odor. Higher concentrations, however, resulted in products with a sharp, unpleasant odor. It is seen in Table IV that at a constant concentration (0.6 phr.) of HCl in a butyl tire curing bag formulation, the processing safety and rate of cure are a function of the weight per cent loading of HCl on the molecular sieve. Notably, shorter scorch times and faster cure rates are obtained at higher loadings of hydrogen chloride. However, even at 20 wt.-percent HCl, the scorch time is considerably improved over other active accelerators.

Generally speaking, it is desirable to use as high a loading as possible of active chemical on a particular molecular sieve. It would appear from Table IV that a loading of about 15 wt.-percent HCl on a molecular sieve gives a product offering good processing safety and rapid rate of cure; this combination, then, appears to be the optimum.

The presence of zinc oxide in "resin cured" butyl rubber formulations employing an HCl-loaded molecular sieve as accelerator, ensures that no corrosive effects will be obtained from any excess HCl. It has been reported that zinc oxide functions as a retarder when used in conjunction with metal halides and has an activating effect with elastomeric type catalysts. With reference to Table V, it may be readily determined that increasing the concentration of zinc oxide results in considerable improvement in Mooney scorch time and also retards the rate of cure to some extent. This is similar to the behaviour of zinc oxide with metal halides. The compression set and heat-aging characteristics appear to be independent of the concentration of zinc oxide. These data indicate that a compounder can obtain a wide range of processing safety with this type of acceleration system while maintaining a rapid cure rate merely by adjusting the amount of zinc oxide in the formulation.

Neoprene W heretofore referred to, as is shown in "The Neoprenes" by N. L. Catton, E. I. Du Pont de Nemours and Company, Wilmington, Delaware, 1952, pages 1 and 41, is a non-sulphur modified synthetic elastomer based on chloroprene, 2-chlorobutadiene-1,3, which functions as mild accelerators for the resin cure of butyl rubber. Formulations containing this type of catalyst are generally considered very safe processing, relatively slow curing and possess good heat-aging characteristics. Referring to Table VI and Example III, in this respect, it is seen that in the absence of neoprene W (test 1), a formulation containing an HCl-loaded molecular sieve was characterized by safe process and fast curing but did not retain high tensile strengths when aged at high temperatures. The further addition of neoprene W to this recipe (2, 3 and 4) reduced the processing safety slightly and had little effect of the cure rate but improved the retention of tensile strength by heat-aged samples.

It was further noted that with the neoprene W present, there was a significant decrease in the elongation of aged specimens; also, increasing concentrations of neoprene W resulted in higher tensile strength and lower elongation after heat aging. These data indicate that by altering the concentration of neoprene W, a wide variety of heat-aging requirements can be met. If high tensile strength is desired and relatively low elongations are satisfactory, high concentrations of neoprene W should be used. If, on the other hand, high elongations must be maintained, lower concentrations of neoprene W should give the desired effect.

TABLE II

*Effect of Various Accelerators on the Resin Cure of a Typical Butyl Rubber Formulation*

| Test | Accelerator | Concentration of Accelerator (phr.)[1] | Mooney Scorch at 250° F. (Minutes) | Cure at 320° F. Tensile (p.s.i.) 15 Min. | 30 Min. | 45 Min. | Physical Properties After 6 days at 300° F.—30 Min. cure Tensile, p.s.i. | Elongation, percent |
|---|---|---|---|---|---|---|---|---|
| 1 | Neoprene W | 5.0 | 211 | 466 | 1,342 | 1,385 | 1,050 | 270 |
| 2 | Stannous chloride | 2.0 | 9 | 1,506 | 2,700 | 2,475 | 2,043 | 175 |
| 3 | Trifluoroacetic acid on sodium zeolite % (20%) | 5.0 | 60 | 1,846 | 2,308 | 2,395 | 254 | 340 |
| 4 | Trifluoroacetic acid on sodium zeolite X. Plus Neoprene W | 5.0 +5.0 | 56 | 1,605 | 2,133 | 2,247 | 1,134 | 300 |
| 5 | Anhydrous hydrogen chloride on sodium zeolite X. Plus Zinc Oxide | 5.0 +2.0 | 52 | 1,605 | 1,781 | 1,867 | 691 | 400 |
| 6 | Anhydrous hydrogen chloride on sodium zeolite X (15%). Plus Zinc Oxide Plus Neoprene W | 5.0 +2.0 +5.0 | 96 | 1,519 | 1,936 | 2,076 | 1,282 | 300 |
| 7 | Chloroacetic Acid | 2.0 | 108 | 873 | 560 | 280 | | |
| 8 | Chloroacetic acid on 13X (20%) | 13.3 | 144 | 1,175 | 231 | 280 | | |

[1] Parts of accelerator per hundred parts of rubber.

TABLE III

*Effect of Concentration of HCl-Loaded Molecular Sieve on Resin Cure of Typical Butyl Tire-Curing Bag Formulation*

| Compound: | Recipe (phr.) | | | |
|---|---|---|---|---|
| Base Compound | 183 | 183 | 183 | 183 |
| Neoprene W | 5.0 | 5.0 | 5.0 | 5.0 |
| Zinc Oxide | 5.0 | 5.0 | 5.0 | 5.0 |
| HCl-Loaded Molecular Sieve | 1.0 | 2.0 | 3.0 | 4.0 |
| Minutes to 5 Point Rise | | | | |
| Mooney Scorch (MS): 250° F | 106 | 102 | 78 | 25 |
| P.s.i. | | | | |
| Ultimate Tensile—Minutes at 320° F.: | | | | |
| 15 | 1,180 | 1,280 | 1,315 | 1,745 |
| 30 | 1,810 | 1,950 | 1,880 | 1,975 |
| 45 | 2,120 | 1,990 | 1,980 | 2,120 |
| Percent | | | | |
| Ultimate Elongation—Minutes at 320° F.: | | | | |
| 15 | 905 | 905 | 860 | 690 |
| 30 | 770 | 755 | 705 | 560 |
| 45 | 660 | 545 | 590 | 535 |
| Units | | | | |
| Shore A Hardness—Minutes at 320° F.: | | | | |
| 15 | 65 | 65 | 66 | 69 |
| 30 | 68 | 70 | 70 | 70 |
| 45 | 72 | 70 | 71 | 72 |
| ASTM D-865-54T—Samples Cured 30 Min. at 320° F. | | | | |
| Properties After 6 days at 300° F.: | | | | |
| Ultimate Tensile (p.s.i.) | 1,750 | 1,520 | 1,525 | 1,570 |
| Ultimate Elongation (percent) | 230 | 190 | 210 | 230 |
| Shore A Hardness (units) | 88 | 88 | 87 | 88 |
| Samples Cured 60 Min. at 320° F. | | | | |
| Compression Set—Method B: 70 hr. at 212° F. (percent) | 61.6 | 57.2 | 57.5 | 53.5 |

TABLE IV

*Effect of Weight-Percent Loading of HCl on Molecular Sieve on Performance of HCl-Loading Molecular Sieve in Resin Cure of a Typical Butyl Tire-Curing Bag*

| | Recipe (phr.) | | | |
|---|---|---|---|---|
| | 1 | 2 | 3 | 4 |
| Compound: | | | | |
| Base Compound | 183 | 183 | 183 | 183 |
| Neoprene W | 5.0 | 5.0 | 5.0 | 5.0 |
| Zinc Oxide | 5.0 | 5.0 | 5.0 | 5.0 |
| HCl-Loaded Molecular Sieve, 5% | 12.0 | | | |
| HCl-Loaded Molecular Sieve, 10% | | 6.0 | | |
| HCl-Loaded Molecular Sieve, 15% | | | 4.0 | |
| HCl-Loaded Molecular Sieve, 20% | | | | 3.0 |
| Minutes to 5 Point Rise | | | | |
| Mooney Scorch (MS): 250° F | 55 | 27 | 27 | 19 |
| P.s.i. | | | | |
| Ultimate Tensile—Minutes at 320° F.: | | | | |
| 15 | 1,410 | 1,695 | 1,745 | 1,975 |
| 30 | 1,845 | 1,880 | 1,975 | 2,265 |
| 45 | 1,935 | 2,000 | 2,120 | 2,205 |
| Percent | | | | |
| Ultimate Elongation—Minutes at 320° F.: | | | | |
| 15 | 545 | 630 | 630 | 640 |
| 30 | 495 | 580 | 560 | 490 |
| 45 | 465 | 530 | 535 | 590 |
| Units | | | | |
| Shore A Hardness—Minutes at 320° F.: | | | | |
| 15 | 75 | 70 | 69 | 72 |
| 30 | 77 | 72 | 70 | 75 |
| 45 | 78 | 74 | 72 | 75 |
| ASTM D-865-54T—Sample Cured 30 Min. at 320° F. | | | | |
| Properties After 6 Days at 300° F.: | | | | |
| Ultimate Tensile (p.s.i.) | 1,185 | 1,445 | 1,570 | 1,634 |
| Ultimate Elongation (Percent) | 235 | 230 | 230 | 210 |
| Shore A Hardness (units) | 87 | 87 | 88 | 88 |

TABLE V

*Effect of Zinc Oxide Concentration on Resin Cured Butyl Tire-Curing Bag Formulation Containing HCl-Loaded Molecular Sieve as Accelerator*

| | Recipe (phr.) | | | | | |
|---|---|---|---|---|---|---|
| | 1 | 2 | 3 | 4 | 5 | 6 |
| Compound: | | | | | | |
| Base Compound | 183 | 183 | 183 | 183 | 183 | 183 |
| Neoprene W | 5.0 | 5.0 | 5.0 | 5.0 | 5.0 | 5.0 |
| Zinc Oxide | 1.0 | 2.0 | 3.0 | 4.0 | 5.0 | 10.0 |
| HCl-Loaded Molecular Sieve | 3.0 | 3.0 | 3.0 | 3.0 | 3.0 | 3.0 |
| Minutes to 5 Point Rise | | | | | | |
| Mooney Scorch (MS): 250° F | 32 | 48 | 58 | 68 | 74 | 80 |
| Samples Cured 60 Minutes at 320° F. | | | | | | |
| Compression Set (Method B): 70 hr. at 212° F | 53.5 | 53.8 | 56.5 | 54.3 | | |
| P.s.i. | | | | | | |
| Ultimate Tensile—Minutes at 320° F.: | | | | | | |
| 15 | 1,850 | 1,555 | 1,475 | 1,470 | 1,400 | 1,305 |
| 30 | 2,145 | 2,000 | 1,950 | 1,875 | 1,900 | 1,900 |
| 45 | 2,020 | 2,075 | 2,165 | 2,170 | 2,095 | 2,075 |
| Percent | | | | | | |
| Ultimate Elongation—Minutes at 320° F.: | | | | | | |
| 15 | 625 | 705 | 765 | 805 | 825 | 830 |
| 30 | 560 | 615 | 625 | 650 | 715 | 690 |
| 45 | 500 | 515 | 580 | 575 | 615 | 575 |
| Units | | | | | | |
| Shore A Hardness—Minutes at 320° F.: | | | | | | |
| 15 | 70 | 70 | 70 | 70 | 70 | 68 |
| 30 | 72 | 70 | 71 | 71 | 70 | 70 |
| 45 | 73 | 73 | 73 | 73 | 73 | 72 |
| ASTM D-865-54T—Samples Cured 30 Min. at 320° F. | | | | | | |
| Properties After 6 Days at 300° F.: | | | | | | |
| Ultimate Tensile (p.s.i.) | 1,415 | 1,440 | 1,490 | 1,505 | 1,565 | 1,505 |
| Ultimate Elongation (percent) | 225 | 240 | 220 | 210 | 225 | 195 |
| Shore A Hardness (units) | 87 | 86 | 86 | 87 | 87 | 88 |

TABLE VI

*Effect of Neoprene W Concentration on Resin Cured Butyl Tire-Curing Bag Formulation Containing HCL-Loaded Molecular Sieve as Accelerator*

| | Recipe (phr.) | | | |
|---|---|---|---|---|
| | 1 | 2 | 3 | 4 |
| Compound: | | | | |
| Base Compound | 183 | 183 | 183 | 183 |
| Neoprene W | | 3.0 | 5.0 | 10.0 |
| Zinc Oxide | 5.0 | 5.0 | 5.0 | 5.0 |
| HCl-Loaded Molecular Sieve | 3.0 | 3.0 | 3.0 | 3.0 |
| Minutes to 5 Point Rise | | | | |
| Mooney Scorch (MS): 250° F | 96 | 80 | 78 | 52 |
| P.s.i. | | | | |
| Ultimate Tensile—Minutes to 320° F.: | | | | |
| 15 | 1,350 | 1,300 | 1,315 | 1,525 |
| 30 | 1,890 | 1,870 | 1,880 | 2,025 |
| 45 | 2,075 | 2,075 | 1,980 | 2,175 |
| Percent | | | | |
| Ultimate Elongation—Minutes at 307° F.: | | | | |
| 15 | 865 | 945 | 860 | 750 |
| 30 | 750 | 765 | 705 | 600 |
| 45 | 685 | 655 | 590 | 540 |
| Units | | | | |
| Shore A Hardness—Minutes at 307° F.: | | | | |
| 15 | 67 | 67 | 66 | 67 |
| 30 | 68 | 70 | 70 | 70 |
| 45 | 70 | 71 | 71 | 72 |
| ASTM D-865-54T—Samples Cured 30 Min. at 320° F. | | | | |
| Properties After 6 Days at 300° F.: | | | | |
| Ultimate Tensile (p.s.i.) | 880 | 1,480 | 1,525 | 1,510 |
| Ultimate Elongation (percent) | 330 | 245 | 210 | 165 |
| Shore A Hardness (units) | 76 | 87 | 87 | 93 |
| Samples Cured 60 Minutes at 320° F. | | | | |
| Compression Set (Method B): 70 hr. at 212° F. (percent) | 51.1 | 54.6 | 57.5 | |

The strong acids used as the active accelerator in the process of the invention may be loaded onto molecular sieves by any method consistent with the physical properties of the particular acid. For example, anhydrous hydrogen chloride gas may be admitted to a closed vessel containing the activated molecular sieve powder preferably while the powder is being blended to insure uniform loading. Acids in liquid form may be sprayed into the blending chamber containing the activated molecular sieve. Included in Examples I and II are two specific loading methods using a sodium X type molecular sieve carrier.

EXAMPLE I

*Adsorption of Anhydrous Hydrogen Chloride on Molecular Sieve Type Sodium X*

In a one-gallon jar containing baffles to insure good blending there was placed 100 grams of Linde Molecular Sieve, sodium X activated powder. While blending on a jar mill anhydrous hydrogen chloride gas was passed into the jar. The powder became quite warm, indicating that rapid adsorption was occurring. After a period of 10 minutes the sodium X powder had adsorbed 17.5 grams of HCl, giving a loading of 14.9 wt.-percent. The resulting product was a free-flowing white powder free from acidic odor.

EXAMPLE II

*Adsorption of Trifluoroacetic Acid on Molecular Sieve Type Sodium X*

In a one-gallon jar containing baffles to insure good blending there was placed 400 grams of Linde Molecular Sieve sodium X activated powder. While blending a total of 111 grams of trifluoroacetic acid were sprayed into the jar through an atomizer. The powder became warm, indicating that rapid adsorption was occurring. The resulting product was a free-flowing white powder containing 21.8 wt.-percent trifluoroacetic acid.

Example III includes the steps for mixing, curing and testing a sample of butyl rubber typical to a tire curing bag formulation. The test data derived therefrom is correlated in Table IV.

EXAMPLE III

*Compounding HCl-Loaded Molecular Sieve Into a Typical Tire Curing Bag Formulation*

A masterbatch was prepared having the following composition:

| | Parts by weight |
|---|---|
| Enjay butyl rubber 218 | 100 |
| High abrasion furnace carbon black (Philblack O) | 60 |
| Vistanex process oil | 10 |
| Stearic acid | 1.0 |

Three hundred forty-two grams of this masterbatch were banded on a 6" x 12" two-roll mill. To this masterbatch was added 10.0 grams of neoprene W, 24.0 grams of Amberol Resin ST 137 (Rohm and Haas para-substituted methylol phenolic resin), 4.0 grams of zinc oxide and 10.0 grams of HCl-loaded sodium X molecular sieve. These ingredients were mixed according to the ASTM standard mixing procedure (reference: ASTM Standards on Rubber Products D–927–55T).

After mixing, the sample was removed from the roll mill in a sheet and a sample cut for determination of Mooney scorch time at 250° F. This measurement was conducted according to ASTM Standards on Rubber Products D–927–55T.

The physical properties were obtained by curing 6" x 6" x 0.075" slabs of rubber in a standard test mold at 320° F. for measured periods of time. The tensile tests were conducted according to ASTM Standard on Rubber Products D–412–51T, the data obtained, here included in Table VII.

The aging properties were conducted by suspending 3 standard tensile specimens in a test tube containing inlet and outlet tubes arranged so that air could freely circulate. These tubes were immersed in a constant temperature oil bath at 300° F. for a period of six days. The tensile properties were then determined as above. These heat-aging tests were conducted in accordance with the ASTM Standards on Rubber Products D–865–54T.

The Mooney scorch time at 250° F. for this formulation was 96 minutes. The physical properties of the cured samples after various periods of time at 320° F., i.e., 15, 30 and 45 minutes, are given in Table VII.

While the herein examples include essentially the use of an acid accelerator within the pores of a synthetic crystalline zeolitic molecular sieve designated as sodium X, the practice of the invention is not so limited. For instance, examples of molecular sieves which might also be used are, calcium zeolite A, zeolite Y, zeolite L, zeolite D and zeolite T wherein the capital letter designates a particular type of three-dimensional lattice structure represented thereby. This may be readily seen by referring to Table VIII which, similar to Table II, contains the results of several tests wherein a variety of molecular sieves both natural and synthetic were used as an HCl carrier in the butyl rubber formulation shown in Table I. The samples tested were erionite (a natural material), calcium zeolite A and sodium zeolite X molecular sieves.

Contrasting the results of the control test (1) of Table II, with the tests (2, 3 and 4) using an HCl-loaded molecular sieve, the Mooney scorch time in each instance, although reduced from that obtained with the control, is still well above the scorch time required for satisfactory processing requirements. Further, both cure time and tensile strength are seen without exception to yield more favorable values.

TABLE VII

*Some Physical Properties of a Resin-Cured Butyl Rubber Formulation Containing HCl-Loaded Molecular Sieve*

| Cure Time (Min. at 320° F.) | Stress at 300% Elongation (p.s.i.) | Ultimate Tensile (p.s.i.) | Ultimate Elongation (p.s.i.) | Shore A Hardness (Units) |
|---|---|---|---|---|
| Original: | | | | |
| 15 | 456 | 1,519 | 800 | 68 |
| 30 | 790 | 1,936 | 650 | 68 |
| 45 | 1,013 | 2,076 | 600 | 72 |
| After 6 days at 300° F.: 30 | 1,282 | 1,282 | 300 | 83 |

TABLE VIII

*Effect of Type Zeolite and HCl Concentration on Resin Cure of a Typical Butyl Rubber Formulation[1]*

| Adsorbent | Wt. percent HCl on Adsorbent | Concentration of Loaded Zeolite (phr.) | Mooney Scorch at 250° F. (Minute) | Cure at 320° F. Tensile (p.s.i.) 15 Min. | 30 Min. | 45 Min. | Physical Properties After 6 days at 300° F. (30 Min. Cure) Tensile (p.s.i.) | Elongation (percent) |
|---|---|---|---|---|---|---|---|---|
| 1. Control | | | 211 | 466 | 1,342 | 1,385 | 1,050 | 270 |
| 2. Erionite | 13.2 | 1.0 | 93 | 1,255 | 1,940 | 2,100 | 1,740 | 210 |
| | 13.3 | 2.0 | 68 | 1,410 | 2,050 | 2,170 | 1,690 | 205 |
| | 13.3 | 3.0 | 45 | 1,505 | 1,950 | 2,050 | 1,450 | 205 |
| | 10.0 | 5.2 | 46 | 1,250 | 2,100 | 2,200 | 1,570 | 215 |
| | 5.0 | 10.4 | 32 | 1,650 | 1,850 | 2,050 | 1,275 | 230 |
| 3. Calcium zeolite A | 9.2 | 1.0 | 100 | 1,050 | 1,805 | 2,140 | 1,850 | 230 |
| | 9.2 | 2.0 | 64 | 1,240 | 1,885 | 2,130 | 1,823 | 220 |
| | 9.2 | 4.0 | 47 | 1,620 | 2,025 | 2,180 | 1,805 | 210 |
| | 5.0 | 7.4 | 84 | 1,225 | 1,730 | 1,865 | 1,515 | 235 |
| 4. Sodium zeolite | 15.0 | 1.0 | 106 | 1,180 | 1,810 | 2,120 | 1,750 | 230 |
| | 15.0 | 2.0 | 102 | 1,280 | 1,950 | 1,990 | 1,518 | 190 |
| | 15.0 | 3.0 | 78 | 1,400 | 1,900 | 2,095 | 1,525 | 210 |
| | 15.0 | 4.0 | 25 | 1,745 | 1,975 | 2,120 | 1,571 | 230 |
| | 20.0 | 3.0 | 19 | 1,705 | 2,065 | 2,160 | 1,634 | 210 |
| | 10.0 | 6.0 | 27 | 1,707 | 2,065 | 2,160 | 1,446 | 230 |
| | 5.0 | 12.0 | 55 | 1,410 | 1,845 | 1,935 | 1,187 | 235 |

[1] All formulations contained 5.0 phr. ZnO and 5.0 phr. Neoprene W.

What is claimed is:

1. A curing accelerator for rubber formulations containing a phenolic resin curing agent, consisting of a halogen-containing acid from the group consisting of HCl, HBr, HI and halogen-substituted organic acids, said acid adsorbed within the pores of a crystalline zeolitic molecular sieve.

2. A curing accelerator as defined in claim 1 where the halogen-containing acid is HCl.

3. A curing accelerator as defined in claim 1 where the halogen-containing acid is trifluoroacetic acid.

4. A curing accelerator as defined in claim 1 where the halogen-containing acid is chloroacetic acid.

5. A composition of matter comprising a synthetic rubbery copolymer of an isoolefin having from 4 to 7 carbon atoms with from 0.5 to 10% of an aliphatic conjugated diolefin having from 4 to 6 carbon atoms, a phenolic resin curing agent and a curing accelerator adsorbed within a crystalline zeolitic molecular sieve.

6. A composition of matter comprising a synthetic rubbery copolymer of an isoolefin having from 4 to 7 carbon atoms with from 0.5 to 10% of an aliphatic conjugated diolefin having from 4 to 6 carbon atoms, a phenol dialcohol curing agent and a curing accelerator adsorbed within a crystalline zeolitic molecular sieve.

7. A composition of matter as described in claim 6 wherein the curing accelerator is a halogen-containing organic acid.

8. A composition of matter as described in claim 6 wherein the curing accelerator is HCl.

9. A composition of matter as described in claim 6 wherein the curing accelerator is trifluoroacetic acid.

10. A composition comprising a synthetic rubbery copolymer of an isoolefin having from 4 to 7 carbon atoms with from 0.5 to 10% of an aliphatic conjugated diolefin having from 4 to 6 carbon atoms, a phenolic resin curing agent and a curing accelerator adsorbed in the pores of a zeolitic molecular sieve having a pore size sufficiently large to adsorb molecules of HCl.

11. A composition comprising a synthetic rubbery copolymer of an isoolefin having from 4 to 7 carbon atoms with from 0.5 to 10% of an aliphatic conjugated diolefin having from 4 to 6 carbon atoms, a phenolic resin curing agent and an accelerator agent adsorbed within the pores of a synthetic crystalline zeolitic molecular sieve, sodium zeolite X.

12. A composition of matter as described in claim 10 where the molecular sieve is calcium zeolite A.

13. A composition of matter comprising a synthetic rubbery copolymer of an isoolefin having from 4 to 7 carbon atoms with from 0.5 to 10% of an aliphatic conjugated diolefin having from 4 to 6 carbon atoms, a sufficient amount of a phenolic resin curing agent to cure such synthetic rubbery copolymer when subjected to heating, and an accelerator for said resin-curing agent adsorbed within the pores of a synthetic zeolitic molecular sieve.

14. A composition of matter as described in claim 13 where the accelerator is anhydrous HCl.

15. A composition of matter as described in claim 13 where the molecular sieve material is sodium zeolite X.

16. A composition of matter as described in claim 13 where the molecular sieve material is calcium zeolite A.

17. Process for the rapid cure of a synthetic rubbery copolymer of an isoolefin having from 4 to 7 carbon atoms with from 0.5 to 10% of an aliphatic conjugated diolefin having from 4 to 6 carbon atoms which comprises providing a heat curable synthetic rubbery copolymer of an isoolefin having from 4 to 7 carbon atoms with from 0.5 to 10% of an aliphatic conjugated diolefin having from 4 to 6 carbon atoms having included therein a sufficient amount of a phenolic resin curing agent to cure such synthetic rubbery copolymer, and a quantity of a curing accelerator material adsorbed within the pores of a molecular sieve, heating such synthetic rubbery copolymer to a curing temperature to release said accelerator material from said molecular sieve, thereby to increase the curing rate of such synthetic rubbery copolymer.

18. Process for the rapid cure of a synthetic rubbery copolymer of an isoolefin having from 4 to 7 carbon atoms with from 0.5 to 10% of an aliphatic conjugated diolefin having from 4 to 6 carbon atoms which comprises providing a heat curable synthetic rubbery copolymer of an isoolefin having from 4 to 7 carbon atoms with from 0.5 to 10% of an aliphatic conjugated diolefin having from 4 to 6 carbon atoms having included therein a sufficient amount of a phenolic resin to cure such synthetic rubbery copolymer, adding to such synthetic rubbery copolymer an accelerator adsorbed within the pores of a molecular sieve, and an amount of a non sulphur modified synthetic elastomer based on chloroprene, 2-chlorobutadiene-1,3, heating such synthetic rubbery copolymer to a sufficient temperature to effectively release said accelerator from said molecular sieve to increase the rate of cure of such synthetic rubbery copolymer.

References Cited in the file of this patent

UNITED STATES PATENTS

| | | |
|---|---|---|
| 1,782,353 | Jaeger et al. | Nov. 18, 1930 |
| 2,283,172 | Bates | May 19, 1942 |
| 2,726,224 | Peterson et al. | Dec. 6, 1955 |
| 2,882,243 | Milton | Apr. 14, 1959 |